United States Patent
Naske

(10) Patent No.: US 7,321,374 B2
(45) Date of Patent: Jan. 22, 2008

(54) METHOD AND DEVICE FOR THE GENERATION OF 3-D IMAGES

(75) Inventor: Rolf-Dieter Naske, Kakenstorf (DE)

(73) Assignee: NewSight Corporation, New York, NY (US)

( * ) Notice: Subject to any disclaimer, the term of this patent is extended or adjusted under 35 U.S.C. 154(b) by 0 days.

(21) Appl. No.: 10/447,463

(22) Filed: May 29, 2003

(65) Prior Publication Data
US 2004/0027346 A1 Feb. 12, 2004

Related U.S. Application Data

(63) Continuation-in-part of application No. PCT/EP01/13674, filed on Nov. 14, 2001.

(51) Int. Cl.
G06T 3/00 (2006.01)
H04N 15/00 (2006.01)

(52) U.S. Cl. .......................... 345/647; 348/44
(58) Field of Classification Search ................ 345/647, 345/648, 649, 672
See application file for complete search history.

(56) References Cited

U.S. PATENT DOCUMENTS

| | | |
|---|---|---|
| 4,781,435 A | 11/1988 | Lippmann et al. |
| 4,925,294 A | 5/1990 | Geshwind et al. |
| 5,510,832 A | 4/1996 | Garcia |
| 5,673,081 A | 9/1997 | Yamashita et al. |
| 5,682,437 A | 10/1997 | Okino et al. |
| 5,717,415 A | 2/1998 | Iue et al. |
| 5,739,844 A | 4/1998 | Kuwano et al. |
| 5,777,666 A | 7/1998 | Tanase et al. |
| 5,808,664 A | 9/1998 | Yamashita et al. |
| 5,892,691 A * | 4/1999 | Fowler ........................ 703/6 |
| 5,953,054 A | 9/1999 | Mercier |
| 5,963,213 A * | 10/1999 | Guedalia et al. ............ 345/427 |
| 5,969,766 A | 10/1999 | Kim |
| 6,018,349 A * | 1/2000 | Szeliski et al. ............. 345/629 |
| 6,061,067 A * | 5/2000 | Silva et al. ................. 345/619 |

(Continued)

FOREIGN PATENT DOCUMENTS

DE 3530601 3/1987

(Continued)

OTHER PUBLICATIONS

Conversion System of Monocular Image Sequence to Stereo Using Motion Parallax, SPIE vol. 3012.

(Continued)

*Primary Examiner*—Jeffery A Brier
(74) *Attorney, Agent, or Firm*—Renner, Otto, Boisselle & Sklar, LLP

(57) ABSTRACT

A method for generating three-dimensional images based on a sequence of two-dimensional images is characterized by the steps of: analyzing a two-dimensional image with respect to its scene type, selecting a deformation assigned to the defined scene type with which the two-dimensional image is deformed, deforming the two-dimensional image and transmitting the deformed two-dimensional image to at least one viewing channel. The method also contemplates applying various transition functions to the two-dimensional image to provide a continuous and smooth transition from one scene type to another. The method can be carried out by an apparatus for performing these functions.

11 Claims, 3 Drawing Sheets

U.S. PATENT DOCUMENTS

| | | | |
|---|---|---|---|
| 6,064,393 A * | 5/2000 | Lengyel et al. | 345/427 |
| 6,108,005 A * | 8/2000 | Starks et al. | 345/419 |
| 6,215,516 B1 | 4/2001 | Ma et al. | |
| 6,215,590 B1 | 4/2001 | Okano | |
| 6,314,211 B1 | 11/2001 | Kim et al. | |
| 6,377,625 B1 | 4/2002 | Kim | |
| 6,392,689 B1 | 5/2002 | Dolgoff | |
| 6,424,351 B1 * | 7/2002 | Bishop et al. | 345/582 |
| 6,456,432 B1 | 9/2002 | Lazzaro et al. | |
| 6,496,598 B1 | 12/2002 | Harman | |
| 2002/0122585 A1 | 9/2002 | Swift et al. | |
| 2002/0126202 A1 | 9/2002 | Wood et al. | |
| 2002/0191841 A1 | 12/2002 | Harman | |
| 2004/0032407 A1 * | 2/2004 | Ejiri et al. | 345/419 |
| 2004/0175039 A1 * | 9/2004 | Miller | 382/181 |

FOREIGN PATENT DOCUMENTS

| | | |
|---|---|---|
| EP | 0520179 | 12/1992 |
| EP | 0 665 697 A2 | 8/1995 |
| EP | 0 714 077 A2 | 5/1996 |
| WO | WO99/03068 | 1/1999 |
| WO | WO99/12127 | 3/1999 |
| WO | WO 01/76258 | 4/2001 |

OTHER PUBLICATIONS

Huang, T.S.: Image Sequence Analysis, Springer-Verlag, 1981, pp. 311-315, 338.

International Search Report for International Application No. PCT/EP01/13674 filed Nov. 24, 2001.

* cited by examiner though these create problems
METHOD AND DEVICE FOR THE GENERATION OF 3-D IMAGES This is a continuation-in-part of International Patent Application No. PCT/EP01/13674, filed Nov. 14, 2001. The International Patent Application has not been published in the English language.

FIELD OF THE INVENTION

The invention relates to a method and a device for generating three-dimensional (3-D) images based on a sequence of two-dimensional (2-D) images.

BACKGROUND OF THE INVENTION

Scientists and medical professionals, for example, have analyzed objects using 3-D imaging for some time. But now various methods have been developed to produce 3-D images, such as television images, for example, for general consumer applications. Among these methods, there is a basic distinction between sequential image transmission, in which the images for the right eye and the left eye are saved to a storage medium, or transmitted alternately, one after the other, and parallel transmission, in which the images are transmitted on two separate channels.

One disadvantage of transmitting sequential images for displaying 3-D images in conventional television systems is that this reduces the refresh rate for each eye to 25 images per second, which creates an unpleasant flickering for the viewer. When transmitting the sequential images in parallel, on separate channels for the left and right eyes, the refresh rate is not reduced and thus flickering does not occur. Problems may still arise with synchronizing both channels, however. Problems also may arise due to the requirements of the receiver, which must be able to receive and process two separate channels simultaneously. This is not possible for most television systems that are now generally available to consumers.

In future television systems, signal transmission and processing will likely be entirely digital. In a digital system, every image is broken down into individual pixels which are transmitted in digitized format. In order to reduce the bandwidth required for this process, the appropriate compression methods are used; however, these create problems for stereo transmission. For example, using block coding methods with a reasonable rate of compression, it is impossible to precisely reconstruct every individual line of an image. In addition, using interframe coding techniques, such as MPEG-2, it is impossible to transmit or save stereo images in a sequential image format because image information from one image is contained in another image. This creates what is called the "crosstalk effect," which makes it impossible to clearly separate the right image from the left image.

Other methods with which a three-dimensional image sequence is generated based on a two-dimensional image sequence have been published in DE 35 30 610 and EP 0 665 697. An autostereoscopic system with interpolation of images is described in EP 0 520 179, and problems with detecting areas of motion in image sequences are discussed in "Huang: Image Sequence Analysis" (Springer Publishing House).

U.S. Pat. No. 6,108,005 describes a method for generating synthetic stereo images in which at least two images are generated based on a loaded image. At least one of the generated images is adjusted (enlarged, reduced, rotated, displaced, or changed) relative to the loaded image in such a way that at least parts of the image are displaced relative to other parts of the image in comparison to corresponding parts in another image. This method has the disadvantage that it is largely dependent on the skill of the operator to select the proper adjustments to generate a correct or natural stereoscopic appearance for the viewer.

SUMMARY OF THE INVENTION

The present invention provides a method and an apparatus with which it is possible to generate 3-D images based on 2-D images, substantially without intervention by an operator or viewer; moreover, the automatically generated 3-D images have a particularly natural three-dimensional appearance.

The present invention provides an method and apparatus that enables on-the-fly or real time conversion of 2D images to 3D images without requiring operator or viewer interventions, such as: selecting areas of the images, identifying objects in an image, selecting objects, outlining objects, displacing objects or segmenting images. By avoiding such image processing requirements, the method and apparatus provided by the present invention eliminate the need for operator/viewer interventions and yet also achieves real time performance.

More specifically, the present invention provides a method for generating three-dimensional (3-D) images based on a sequence of two-dimensional (2-D) images that includes the following steps:
  analyzing a two-dimensional image with respect to its scene type;
  assigning a deformation to the defined scene type;
  deforming the two-dimensional image; and
  transmitting the deformed two-dimensional image to at least one viewing channel.

The method may further include the step of defining a scene type as one of a close-up shot, a normal shot (medium shot), and a wide angle shot.

The step of assigning may include assigning a spherical deformation to the close-up-shot scene type, in which case deforming includes distorting the pixels of the two-dimensional image concentrically from the midpoint of the image outward.

Alternatively, the step of assigning may include assigning a sphere-tilt deformation to the normal-shot scene type, in which case deforming includes simultaneously distorting and expanding the pixels of the two-dimensional image from top to bottom and concentrically from the midpoint of the image.

As a further alternative, assigning may include assigning a tilt deformation to the wide-angle-shot scene type, in which case deforming includes incrementally, continuously, and horizontally expanding the pixels of the two-dimensional image.

The method also may include the step of producing first and second viewing channels using different angles of observation of the deformed image.

Further, the method may include the step of interpolating a predetermined number of sequential images from at least one two-dimensional image to produce at least a portion of the sequence of two-dimensional images.

When the scene type of an image is different than that of a previous image, the method may include applying a transition function to the image to continuously adjust the assigned deformation from the deformation type assigned to the previous scene type to the deformation type assigned to the new scene type to prevent an unnatural appearance of the image. The step of applying the transition function may include applying a predetermined number of transition deformations and the new image deformation, whereby the transition deformations are calculated by interpolation of the previous deformation and of the new deformation for every pixel.

The present invention also provides an apparatus for implementing the method, characterized by a device for scene analysis of a loaded image by defining at least a partial image and comparing the partial image to the whole image.

Such a device for scene analysis may be equipped for defining a partial image with variable size near the center of a whole image and for calculating a root mean square deviation of the partial image and of the whole image in order to define a scene type as a close-up shot or a normal shot based on this.

Such a device for scene analysis may be equipped for defining a plurality of partial images near the edge of the whole image and for calculating an absolute amount of the cross-correlation between different areas of the image in order to define a scene type as a wide angle shot based on this.

The apparatus may further include an image deformation storage device for storing a plurality of scene types, one type of deformation assigned to each scene type, and one type of transition deformation assigned to each transition between two deformations.

According to another embodiment of the invention, an apparatus for generating 3-D images includes an input to receive a sequence of 2-D images, a scene analysis device to analyze scene types of 2-D images, a number of image deformation routines (matrices) related to respective scene types, and an image deformation device for deforming 2-D images based on scene type and associated deformation routine to provide respective sequences of 3-D images.

The apparatus also may include at least one of an image storage device for storing input 2-D images and a phase selector for providing respective sequences of image for respective left eye and right eye viewing as 3-D images.

The method described above also may be performed by a computer with an executable program and program code devices for performing the steps of the method. Such a program, as well as the program code devices, may be stored on a computer-data-readable medium.

The present invention also contemplates a digital image processing system for generating three-dimensional images that are transmitted or stored in two-dimensional format that includes the apparatus.

The claims fully describe and particularly point out the foregoing and other features of the invention. The following description and the annexed drawings set forth in detail an illustrative embodiment of the invention; this embodiment is indicative, however, of but one of the ways in which the principles of the invention may be employed.

The following description of an exemplary embodiment, with reference to these drawings, provides additional details, features, and advantages of the invention.

DETAILED DESCRIPTION

Figure 1:
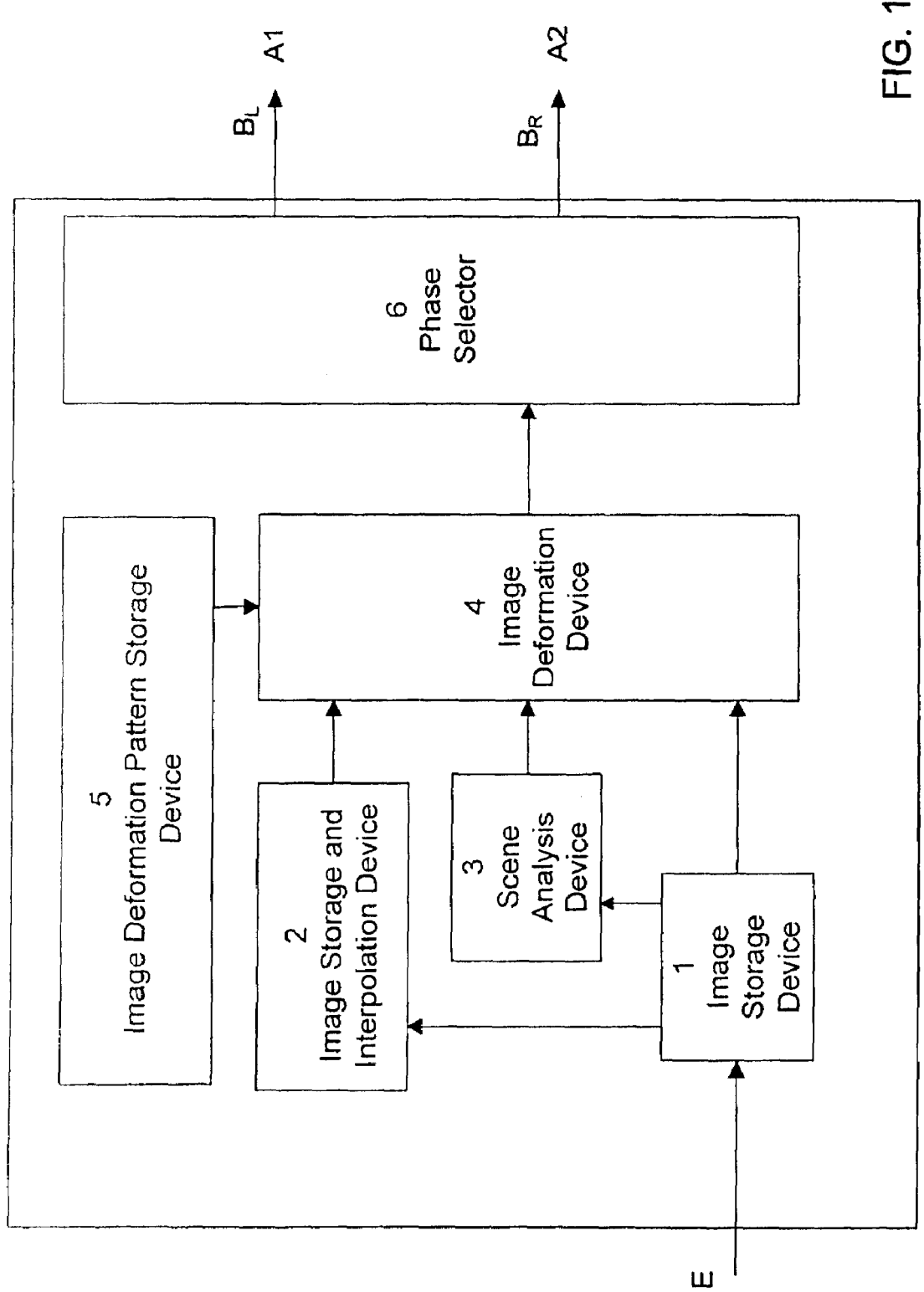
FIG. 1 is a schematic block diagram of circuitry according to the invention.

The basic components of an apparatus according to the invention and their interconnections are schematically illustrated in FIG. 1. The apparatus shown in FIG. 1 may be implemented in a digital image processing system (not shown) for the generation of 3-D images transmitted or stored in a 2-D format. The apparatus generates the 3-D images from a series of 2-D images. The 2-D images may be recorded by a camera and digitized before they are provided to the apparatus provided by the invention.

Structure of the Illustrated Apparatus

The apparatus shown in FIG. 1 has a first input E for receiving the 2-D images, which are loaded into a first image storage device 1 for the temporary storage of at least one of each given image.

The loaded images are transmitted from the first image storage device 1 to a second image storage device 2, which is connected to the first storage device 1 and is equipped to store and interpolate a predetermined number of sequential images.

In addition, a device 3 for scene analysis also is connected to the first image storage device 1. The current image stored in the first image storage device 1 is analyzed with respect to its contents by the device 3 in order to assign it to a specific scene type, such as "close-up," "normal shot" (medium shot), or "wide angle shot."

The device 3 for scene analysis is connected to a device 4 for image deformation, by which an image loaded from the first image storage device 1 is subjected to an image deformation assigned to this scene type according to the scene type determined by the scene analysis device 3.

The second image storage device 2 also is connected to the image deformation device 4. So, an image generated in the second image storage device 2 by interpolating previous images also can be deformed.

Different patterns for such image deformations and their assignment to at least one scene type are stored in an image deformation storage device 5, from which the patterns can be accessed by the device 4 for image deformation.

In addition, a phase selector 6 is connected to an output of the image deformation device 4. Both the non-deformed image from the first image storage device 1, and the deformed image, which is based on the non-deformed image, generated by the image deformation device 4, can be transmitted to the phase selector 6. The images are then connected to a first or second output A1, A2 of the phase selector 6 and respectively form a first or second sequence of images, which are loaded to a left or right viewing channel BL, BR for a left or right stereo (3-D) image.

Thus, in the illustrated embodiment one image sequence is composed of the unaltered, loaded images and the other image sequence is composed of the deformed images that were generated based on the unaltered images (asymmetrical deformation). Alternatively, it is also possible to deform the images of both image sequences (symmetrical deformation). An additional or alternative possibility is to load an image interpolated in the second image storage device 2 into the image deformation device 4 and to construct the first and/or second image sequence (deformed and/or non-deformed) based on the interpolated image.

Interpolation of an image sequence $x(i, j, \alpha)$ stored in the second image storage device 2 is used to calculate the interpolated image; for example, by linear spline approximation or a higher-level or polynomial approximation of all pixels, where $\alpha$ is an approximation variable representing the time interval from a given image during which a synthetic (interpolated) image is generated. International Application Publication No. WO 01/76258 describes exemplary interpolation methods, which are incorporated by reference into this document.

Thus, with the apparatus provided by the invention, a first and a second image sequence can be generated based on a sequence of images that is recorded in two dimensions and digitized. The digitized sequence of 2-D images is connected to input E, and the generated first and second image sequence together make a 3-D view of the originally 2-D image possible when the first and second image sequences are presented to a left or right eye.

Image Deformation Methods

In the following paragraphs, methods of generating the 3-D images are described. First, a method for the generation of a stereo image sequence by "asymmetrical" image deformation is described. In this method, the loaded image sequence, substantially unaltered (i.e., subjected to a "null deformation"), is used as the first image sequence and the second image sequence is generated by deformations of the images from the first image sequence.

Next, a second method for the generation of a stereo image sequence by "symmetrical" image deformation is described. In this method the images of the first image sequence are also deformed images.

Finally, it is then described how the type of image deformation can be selected and adjusted or optimized based on scene analysis in real time according to image content (scene type) and how the transition between different image deformations can be made to avoid disruptive transition effects.

A.) Deformation Methods

Assume $x_{ij}$ is a digitized image from the first image sequence at time t (first stereo image) with a horizontal resolution I and a vertical resolution J. The second stereo image $x^*(i^*, j^*)$ is derived as follows:

$$i^* := i + i\_index\ (i, j)\ \text{or}\ j^* := j + j\_index\ (i, j).$$

This means that the new pixels $i^*$ and $j^*$ result from displacement in the direction of i and j. In principle, any mathematical functions may be used for this; therefore, the deformations described below are only provided as examples as such functions.

I.) Null Deformation Method

Three different deformations are illustrated for the first method:

1.) Tilt Deformation:

In this case, the pixels of the new image are expanded horizontally and continuously incrementally from top to bottom according to the following formulas:

$$i\_index\ (i, j) := 0;$$

$$j\_index\ (i, j) := (1 - (tL-i)/tL)\ ((0.5\ PpL-j)/0.5\ PpL)^* \text{tilt}$$

for i:=0, . . . , tL and j:=0, . . . , PpL

This means: tL is the number of lines, PpL is the number of pixels per line, and "tilt" is any scaling constant that defines the level of expansion.

2.) Sphere Deformation:

In this case, the pixels of the new image are distorted concentrically from the midpoint of the image to its edge according to the following formulas:

$$i\_index\ (i, j) := ((0.5\ PpL-j)/0.5\ PpL)\ (1-(4/tL^2)\ (0.5\ tL-i)^2)^* \text{sphere}$$

$$j\_index\ (i, j) := ((0.5\ tL-i)/0.5\ tL)\ (1-(4/PpL^2)\ (0.5\ PpL-j)^2)^* \text{sphere}$$

for i:=0, . . . , tL and j:=0, . . . , PpL

This means: tL is the number of lines, PpL is the number of pixels per line, and "sphere" is any scaling constant that defines the level of distortion.

3.) Sphere-Tilt Deformation:

In this case, the pixels of the new image are distorted and expanded simultaneously from top to bottom and concentrically from the midpoint according to the following formulas:

$$i\_index\ (i, j) := ((0.5\ PpL-j)/0.5\ PpL)\ (1-(4/tL^2)\ (0.5\ tL-i)^{sphere}$$

$$j\_index\ (i, j) := ((0.5\ tL-i)/0.5\ tL)\ (1-(4/PpL^2)\ (0.5\ PpL-j)^2)^*\ \text{sphere} + ((tL-i)/tL)\ ((0.5\ PpL-j)/0.5\ PpL)^*\ \text{tilt}$$

for i:=0, . . . , tL and j:=0, . . . , PpL

This means: tL is the number of lines, PpL is the number of pixels per line, "sphere" is any scaling constant that defines the level of distortion, and "tilt" is any scaling constant that defines the level of expansion.

II.) Symmetrical Deformation Method

Figure 2:
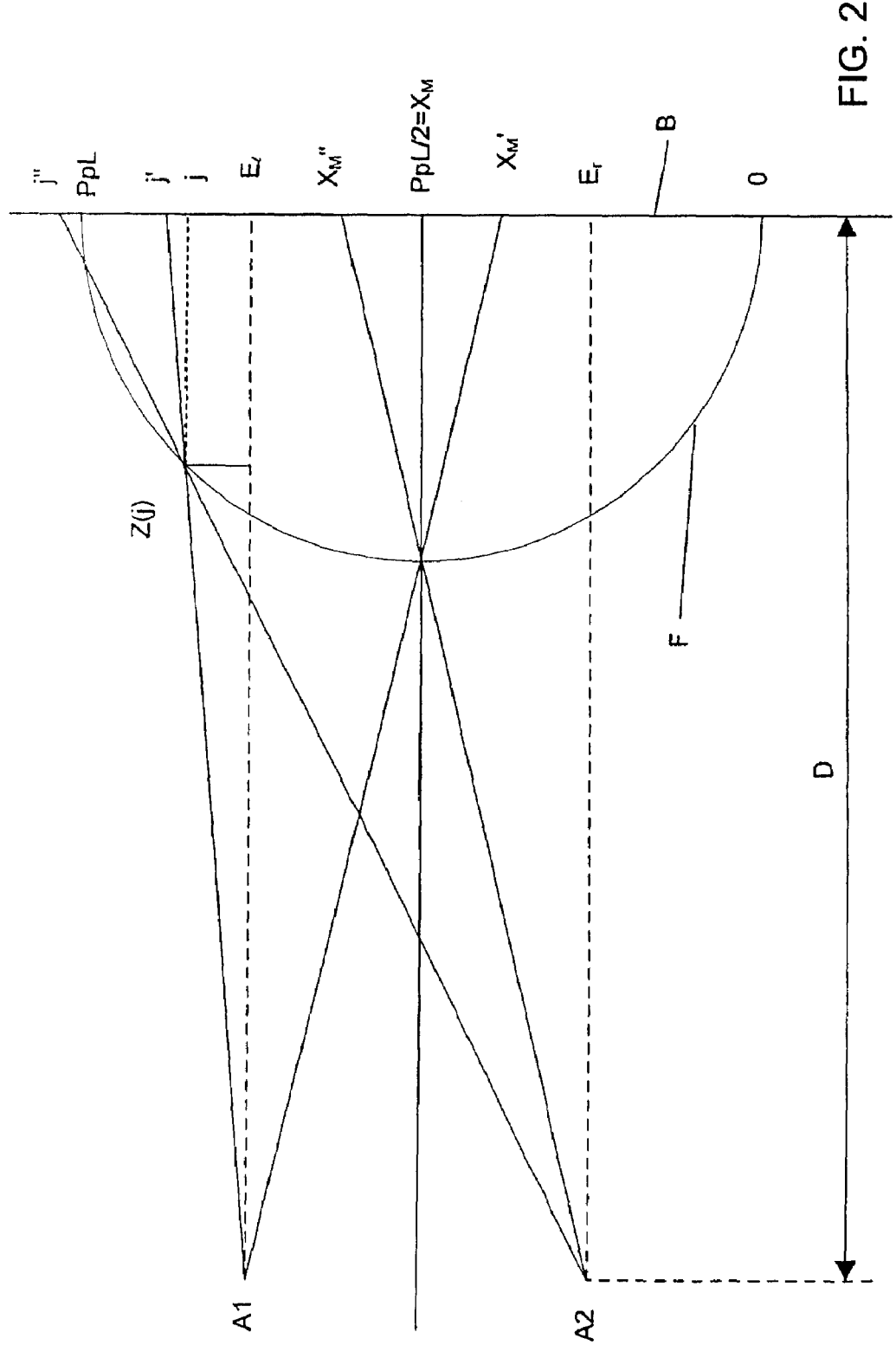
FIG. 2 is a schematic representation describing a deformation by sphere projection.

The second method uses symmetrical image deformation, in which a given original image is deformed (e.g., geometrically distorted). In its generalized form as shown in FIG. 2, it represents a picture of the given pixels 0 to PpL of an image plane B on a curved surface F (picture area), whereby the picture is viewed at a distance D from two perspectives for the left and right eye A1, A2. From the perspective of the viewer, the pixels (for example, z(j) or the area $x_M$) on the picture area F are projected back onto the image plane B in different manners for each eye A1, A2 (j' and $x_M{'}$ for A1 or j" and $x_M{"}$ for A2). This creates the impression in the viewer's brain of viewing the images from two angles of observation.

Again, in principle any mathematical functions or projection surfaces can be used. Examples of two deformations are described below:

1.) Sphere Projection:

In this case, the image area represents a convex spherical surface. For every original pixel x(i, j), a "synthetic" pixel z(i, j) will result on a spherical surface curved toward the viewer:

$$z(i,j) := (1-(4/PpL^2)(0.5PpL-j)^2)(1-(4/tL^2)(0.5tL-i)^2)^*\ \text{sphere}$$

Again, this means: tL is the number of lines, PpL is the number of pixels per line, and "sphere" is any scaling constant which defines the level of distortion.

According to the theorem on intersecting lines, a j index is shown for a left viewing position $E_1$ by:

$$j' = \{(j-E_1)/(1-z(i, j)/D)\} + E_1$$

Since it is true that $0 \leq z(i, j) \leq$ sphere, it may be seen that the "sphere" constant must always be smaller than the viewing distance D.

For the right viewing position $E_r$, the following will result:

$$j'' := \{(j-E_r)/(1-z(i, j)/D)\} + E_r$$

2.) Cylindrical Projection:

In this case, the image area represents a convex cylindrical surface. For every original pixel $x(i, j)$, a "synthetic" pixel $z(i, j)$ will result on a cylindrical surface curved toward the viewer:

$$z(i, j) := (1-(4/PpL^2) (0.5PpL-j)^2) * \text{sphere}$$

Again, this means: PpL is the number of pixels per line and "sphere" is any scaling constant which defines the level of distortion.

For the new indices j' and j", the following will again result for a left viewing position $E_1$, as with sphere projection $E_1$:

$$j' := \{(j-E_1)/(1-z(i, j)/D)\} + E_1$$

and for a right viewing position $E_r$:

$$j'' := \{(j-E_r)/(1-z(i, j)/D)\} + E_r$$

The number of viewing positions is not limited to two for sphere or cylinder projection. Instead of just one left and one right viewing position, basically as many left and right viewing positions $E_k$ (k=1, . . . n) as desired can be calculated. This is particularly useful for autostereoscopic multi-viewer monitors.

Since values may not be assigned to all the indices of the new image by the values j' and j" of both of the aforementioned indices, the "gaps" which arise because of this must be offset or "filled in" by subsequent smoothing and interpolation processes.

For both methods (I and II), every individual deformation is precisely described by the i_index and j_index indices. The values (displacement values) yielded by the above-stated formulas for the displacement of each pixel are stored in the image deformation storage device 5 for each deformation.

B.) Scene Analysis

Methods will now be described below with which scene analysis can be performed and with which the type of image deformation used can be dynamically controlled or selected based on the scene type defined.

The method may use three different scene types for which the image will be analyzed. In principle, however, a larger number of scene types can be defined.

The examples of scene types described here are the close-up shot N, the wide angle shot, W, and the medium shot (normal shot) M.

In a close-up shot, an object is placed at the midpoint of the image and covers the majority of the image from the midpoint outward. Sphere projection is best-suited for deformation (conversion) in this case. This will also achieve a certain "pop-out" effect, in which the center of the image appears to project out of the image toward the viewer.

Wide angle shots are often used for landscape shots. In this case, a tilt deformation is generally used to achieve the best three-dimensional effect.

If there is a group of objects in the center of the image which is being followed by the camera at a certain distance (normal or medium shot), the best three-dimensional effect is generally created by using sphere-tilt deformation.

For the following calculations, P is first a fixed constant, where P:=0.2 ($0 \leq P \leq 0.5$).

1.) Close-Up Scene Type

Defining the "close-up shot" scene type (N):

$x_N$ is a rectangular partial image of a given image near the center of the image containing, for example, 60 percent of all the pixels in the whole image $x_G$.

$\delta_G^2$ is the root mean square deviation (variance) of the whole image $x_G = x(i, j)$ and, furthermore, $\delta_N^2$ is the root mean square deviation (variance) of the partial image $x_N$. If $\delta_N^2 \leq P \delta_G^2$, then the scene type has been defined as a close-up shot N. In this case, it will be true that:

$$\delta_N^2 := \Sigma(x_{ij} - x_N)^2 \text{ over } i, j \in x_N$$

with the mean value $x_N := (1/|x_N|) \Sigma x_{ij}$ over i, j $\in x_N$.

2.) Medium-Shot Scene Type

Defining the "normal or medium shot" scene type (M):

$x_M$ is a rectangular partial image of a given image near the center of the image containing, for example, 40 percent of all the pixels in the whole image $x_G$.

$\delta_G^2$ is the root mean square deviation (variance) of the whole image $x_G = x(i, j)$ and, furthermore, $\delta_M^2$ is the root mean square deviation (variance) of the partial image $x_M$. If $\delta_M^2 \leq P \delta_G^2$, then the scene type has been defined as a medium shot M. In this case, it will be true that:

$$\delta_M^2 := \Sigma(x_{ij} - x_M)^2 \text{ over } i, j \in xM$$

with the mean value $x_M := (1/|x_M|) \Sigma x_{ij}$ over i, j $\in x_M$.

3.) Wide-Angle-Shot Scene Type

Defining the "wide angle shot" scene type (W):

$x_1$ and $x_2$ are two rectangular partial images in the left or right upper region of the image, and $y_1$ and $y_2$ are two rectangular partial images in the left or right lower region of the image. Furthermore, the absolute amount of cross-correlation between the X regions of the image is defined as $$k_x := |(\Sigma x_{1i} x_{2i})/(\sqrt{(\Sigma x_{1i}^2 \Sigma x_{2i}^2)})|$$

and the absolute amount of the cross-correlation between the Y regions of the image is defined as $$k_y := |(\Sigma y_{1i} y_{2i})/(\sqrt{(\Sigma y_{1i}^2 \Sigma y_{2i}^2)})|$$

If it is true that $k_x \leq 1-P$ and $k_y \geq 1-P$, then the X and the Y regions are highly correlated. This is defined as the wide angle scene type W.

C.) Scene Transitions

When using image deformation, it must be remembered that when the scene type is changed with respect to the previous scene type, it is not easy to switch between the assigned deformation functions. This would be perceived by the viewer as disruption or "slowing" or "jumping."

In this case, a transition function distributes the previous deformation across two or three images relatively smoothly or continuously carries the previous deformation over into a new deformation. Thus, the deformation is dynamically adjusted to the new image content.

For this reason, a transition deformation is defined for every transition from an "old" deformation to another "new" deformation, which also may be stored in the image deformation storage device 5. Such a transition deformation is formed of a preset number K of transition matrices. The values of the transition matrices also are stored in the image deformation storage device 5, and are calculated by linear interpolation of the displacement values, which are stored for each pixel for the old and new deformations.

When the scene type changes, the transmitted image whose scene type has changed is subjected to a transition function, which consists of the transition deformation defined by the number K of transition matrices, and the subsequent new deformation assigned to the new scene type.

Any further scene changes, as determined by scene analysis are not taken into account while the transition function is being applied. For example, assume that the scene type of the image which has just been transmitted is "wide angle shot," while the previously transmitted image was a "close-up shot." Accordingly, one would switch from the (old) "sphere" image deformation assigned to close-up images to the (new) "tilt" image deformation assigned to wide angle shots. In addition, assume the number K=2, and two transition matrices are thus established. Therefore, before the new image deformation is used, the image which was just transmitted must be processed with the first transition matrix and then the next image must be processed with the second transition matrix. These two matrices together form the transition deformation.

The individual values contained in the transition matrices and each value representing the transition displacement of one pixel are derived by linear interpolation of the displacement values of the old image deformation (sphere) and the new image deformation (tilt) according to the number K of the transition matrices. For example, if the displacement value of the old image deformation is 0 and the displacement value of the new image deformation is 6.0 for a given pixel, then for K=2 a displacement value of 2.0 will result for this pixel in the first transition matrix, and a displacement value of 4.0 in the second transition matrix.

All transition matrices can be calculated in advance for all possible transitions between scene types and thus between their respectively assigned transition matrices, and the matrices can be stored in the image deformation storage device 5.

The transition matrices for transition from a first type of deformation to a second type will be applied to the transmitted image in reverse order when there is a transition from the second type to the first type of deformation.

Operation of the Illustrated Apparatus

Figure 3:
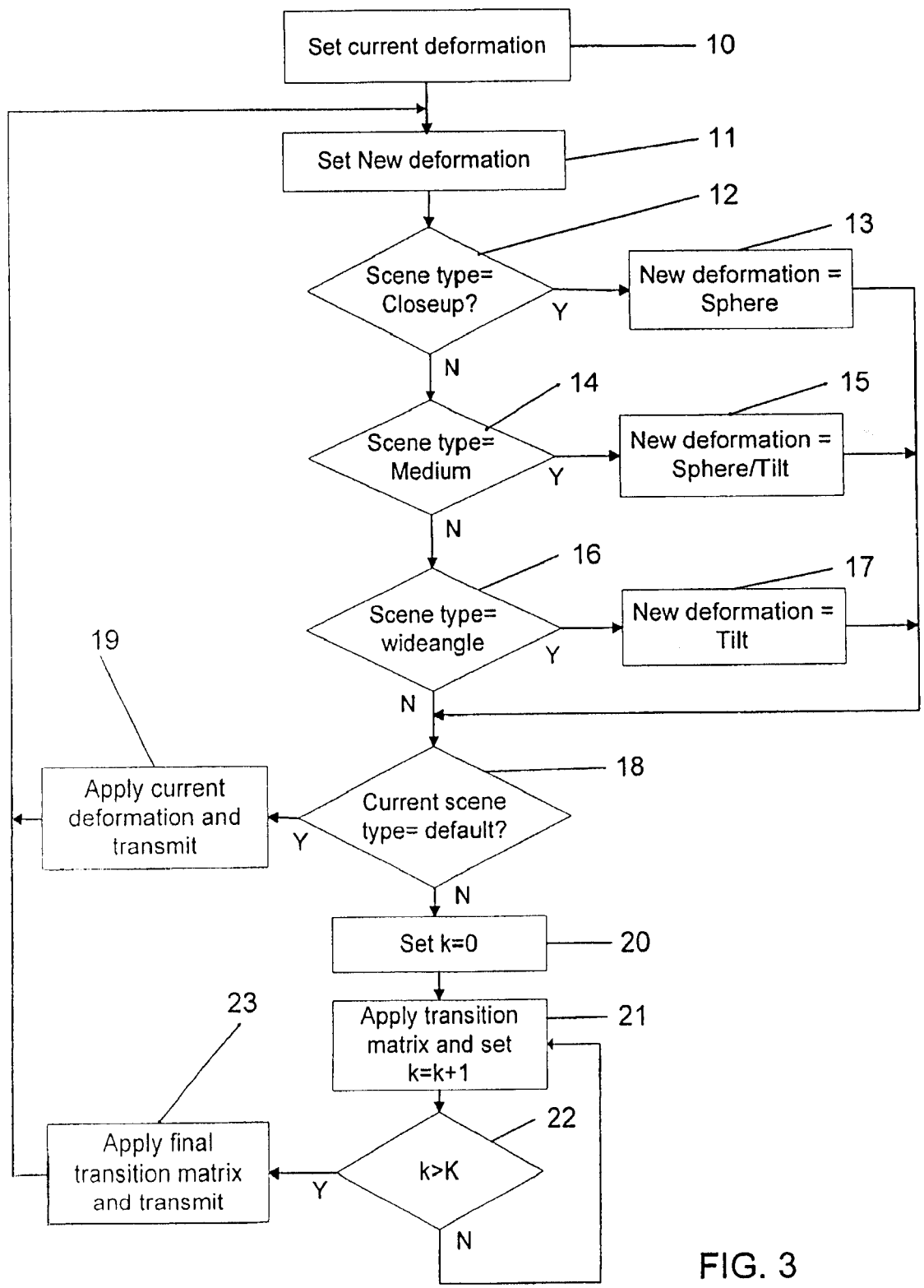
FIG. 3 is a flow diagram of a method according to the invention.

FIG. 3 shows a flow diagram of a method according to the invention.

In the first step 10, after switching on the apparatus for image deformation 4, a first status, "Current deformation," is set as the deformation used for initial deformation, which may be cylinder deformation, for example. In the second step 11, a second status, "New deformation" is set for a standard or default deformation, which may also be set to cylinder deformation, and then the scene type of the current (loaded) image will be determined by means of the device 3 for scene analysis.

In the third step 12, a query is made to determine whether the scene type defined is a close-up shot N. If so, the second status will be set to "New deformation:=sphere" in the fourth step 13, and it will continue with (the ninth) step 18.

If the response to the query in the third step 12 is no, it will query in the fifth step 14 whether the scene type defined is a medium shot M. If so, the second status will be set to "New deformation:=sphere-tilt" in the sixth step 15, and it will continue with (the ninth) step 18.

If the response to the query in the third step 14 is no, it will query in the fifth step 16 whether the scene type defined is a wide angle shot M. If so, the second status will be set to "New deformation:=tilt" in the eighth step 17, and it will continue with (the ninth) step 18.

If the response to the query in the seventh step 16 is also no, it will continue with the ninth step 18, which queries whether the types of deformation set in the first and second status are the same.

The steps 11 through 18 are performed with the device 3 for scene analysis.

If the response to the query in the ninth step 18 is yes, the current image will be subjected to (unaltered) image deformation by means of the device 4 for image deformation in the tenth step 19 and transmitted as an image in the second image sequence. The process is then repeated for the next image starting with the second step 11.

If the response to the query in the ninth step 18 is no, the transition function will be used, and the value k of a meter will then be set to k:=0 in the eleventh step 20.

Next, in the twelfth step 21 the current image of the image storage device 1 is deformed with the first transition matrix and transmitted as an image in the second image sequence. In addition, the value of the meter is increased by 1 (k:=k+1). In the thirteenth step 22, it will query whether the meter count k is larger than the number K of transition matrices.

If no, the twelfth step 21 will be repeated and the current image of the image storage device 1 will be deformed by, of course, the second (next) transition matrix and then be transmitted as the next image in the (second) image sequence.

After the predetermined number K of transition matrices has been used, the now current image will be subjected to the new image deformation specified in steps 13, 15, or 17 to complete the transition deformation, and the meter count will again be increased by a value of 1. The response to the following query in the thirteenth step 22 will then be yes, so it will continue in the fourteenth step 23, during which the first status, "Current deformation" will be set to the new deformation. The process will then be repeated for the next image loaded by returning to the second step 11.

The methods described may be implemented in the form of one or more computer programs with program code devices for the performance of the individual steps by a computer, in particular a microprocessor unit.

The methods can also be implemented as a computer program with program code stored on a machine-readable medium for the performance of the steps of the method if it is loaded into the memory of a programmable microprocessor unit or executed on a computer, whereby the microprocessor or computer is a component of a digital image processing system.

Although the invention has been shown and described with respect to one embodiment, equivalent alterations and modifications will occur to others skilled in the art upon reading and understanding this specification and the annexed drawings. The functions performed by the above described integers (components, assemblies, devices, compositions, etc.), and the terms (including a reference to a "means") used to describe such integers, are intended to correspond, unless otherwise indicated, to any integer that performs the specified function of the described integer (e.g., that is functionally equivalent), even though not structurally equivalent to the disclosed structure that performs the function in the illustrated exemplary embodiment of the invention. In addition, while a particular feature of the invention may have been described above with respect to only one of several possible embodiments, such feature may be combined with one or more other features of the other embodiments, as may be desired and advantageous for any given or particular application.

What is claimed is:

1. An apparatus for implementing a method for generating three-dimensional (3-D) images on a sequence of two-dimensional (2-D) images, the apparatus including a device for scene analysis that performs the following steps:
   analyzing a two-dimensional image to determine its scene type;
   assigning a deformation to the determined scene type;
   deforming the two-dimensional image using the deformation assigned to the determined scene type; and
   transmitting the deformed two-dimensional image to at least one viewing channel;
   wherein the analyzing step includes defining a partial image with variable size near the center of the whole two-dimensional image and calculating a root mean square deviation of the partial image and of the whole two-dimensional image in order to define a scene type as a close-up or a normal shot based on this calculation.

2. An apparatus according to claim 1, including a synthesis device for interpolating a predetermined number of sequential images from at least one input 2-D image to produce at least a portion of the image sequences.

3. An apparatus for implementing a method for generating three-dimensional (3-D) images based on a sequence of two-dimensional (2D) images, the apparatus including a device for scene analysis that performs the following steps:
   analyzing a two-dimensional image to determine its scene type;
   assigning a deformation to the determined scene type;
   deforming the two-dimensional image using the deformation assigned to the determined scene type; and
   transmitting the deformed two-dimensional image to at least one viewing channel;
   wherein the analyzing step includes defining a plurality of partial images near the edge of the whole two-dimensional image and calculating an absolute amount of the cross-correlation between different areas of the whole two-dimensional image in order to define a scene type as a wide angle shot based on this calculation.

4. An apparatus according to claim 3, including a synthesis device for interpolating a predetermined number of sequential images from at least one input 2-D image to produce at least a portion of the image sequences.

5. A method for generating three-dimensional (3-D) images based on a sequence of two-dimensional (2-D) images, comprising the steps of:
   analyzing a two-dimensional image to determine its scene type;
   assigning a deformation to the determined scene type;
   deforming the two-dimensional image using the deformation assigned to the determined scene type; and
   transmitting the deformed two-dimensional image to at least one viewing channel,
   wherein the analyzing step includes defining a partial image with variable size near a central portion of the whole two-dimensional image and calculating a root mean square deviation of the partial image and of the whole two-dimensional image, and determining the scene type as a close-up shot or a normal shot based on this calculation.

6. A method according to claim 5, further comprising interpolating a predetermined number of sequential images from at least one two-dimensional image to produce at least a portion of the sequence of two-dimensional images.

7. A method for generating three-dimensional (3-D) images based on a sequence of two-dimensional (2-D) images, comprising the steps of:
   analyzing a two-dimensional image to determine its scene type;
   assigned a deformation to the determined scene type;
   deforming the two-dimensional image using the deformation assigned to the determined scene type; and
   transmitting the deformed two-dimensional image to at least one viewing channel,
   wherein the analyzing step includes defining a plurality of partial images near an edge of two-dimensional image and calculating an absolute amount of cross-correlation between different partial images and determining a scene type as a wide-angle shot based on this calculation.

8. A method according to claim 7, further comprising interpolating a predetermined number of sequential images from at least one two-dimensional image to produce at least a portion of the sequence of two-dimensional images.

9. A method for generating three-dimensional (3-D) images based on a sequence of two-dimensional (2-D) images, comprising the steps of:
   analyzing a two-dimensional image to determine its scene type from a plurality of scene types;
   assigning a deformation to each scene type;
   deforming the two-dimensional image using the deformation assigned to the determined scene type; and
   transmitting the deformed two-dimensional image to at least one viewing channel, and repeating the analyzing, deforming and transmitting steps;
   wherein the assigning step includes assigning a transition deformation for a transition between every pair of scene types; and
   when the scene type of a current image is different than that of a previous image, the deforming step includes applying the assigned transition deformation to at least the current image to adjust the deformation from the deformation asigned to the previous scene type to the deformation assigned to the current scene type to prevent or minimize an unnatural appearance of the image.

10. A method according to claim 9, wherein applying the transition deformation includes applying a predetermined number of transition deformations to successive images, starting with the current image, whereby the transition deformations are calculated by interpolation between the deformation for the previous scene type and the deformation for the current scene type.

11. A method according to claim 9, further comprising interpolating a predetermined number of sequential images from at least one two-dimensional image to produce at least a portion of the sequence of two-dimensional images.

* * * * *